US009148621B2

(12) United States Patent
Dachiku

(10) Patent No.: US 9,148,621 B2
(45) Date of Patent: Sep. 29, 2015

(54) MULTI-FORMAT OUTPUT DEVICE, CONTROL METHOD FOR MULTI-FORMAT OUTPUT DEVICE

(71) Applicant: KABUSHIKI KAISHA TOSHIBA, Tokyo (JP)

(72) Inventor: Kenshi Dachiku, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/026,570

(22) Filed: Sep. 13, 2013

(65) Prior Publication Data

US 2014/0078392 A1    Mar. 20, 2014

(30) Foreign Application Priority Data

Sep. 14, 2012   (JP) ................. 2012-203347

(51) Int. Cl.
*H04N 21/234* (2011.01)
*H04N 21/2343* (2011.01)
*H04N 21/488* (2011.01)
*H04N 7/01* (2006.01)
*H04N 7/088* (2006.01)
*H04N 21/236* (2011.01)

(52) U.S. Cl.
CPC ........... *H04N 7/0125* (2013.01); *H04N 7/0882* (2013.01); *H04N 7/0885* (2013.01); *H04N 21/23406* (2013.01); *H04N 21/23614* (2013.01); *H04N 21/234309* (2013.01); *H04N 21/4884* (2013.01)

(58) Field of Classification Search
CPC .......... H04N 21/235; H04N 21/44004; H04N 21/4331; H04N 21/23614; H04N 21/2365; H04N 21/2368; H04N 21/4341; H04N 21/4348; H04N 21/4347; H04N 21/4307; H04N 21/4888; H04N 5/04; H04N 5/067; H04N 5/0736; H04N 7/0117; H04N 7/1736; H04N 7/17309; H04N 7/173; H04N 7/17336
USPC ......... 348/441, 445, 500, 501, 465, 467, 468, 348/512, 515, 584; 725/54, 90, 91, 725/114–115; 386/353
See application file for complete search history.

(56) References Cited

U.S. PATENT DOCUMENTS

| | | | | |
|---|---|---|---|---|
| 5,453,796 | A * | 9/1995 | Duffield et al. | 348/565 |
| 5,576,769 | A * | 11/1996 | Lendaro | 348/511 |
| 5,805,173 | A * | 9/1998 | Glennon et al. | 345/501 |
| 5,831,591 | A * | 11/1998 | Suh | 715/201 |

(Continued)

FOREIGN PATENT DOCUMENTS

JP    2010074559 A    4/2010

*Primary Examiner* — Brian Yenke
(74) *Attorney, Agent, or Firm* — Patterson & Sheridan, LLP

(57) ABSTRACT

A multi-format output device includes decoders to decode first encoded data and second encoded data to generate a first video data having a first-type format with first caption data also having the first-type format, and second video data having a second-type format with second caption data also having the second-type format. A conversion unit converts video data of one format type into video data video data having another format-type. A buffer holds the first video data by the period of time needed for the video data conversion processing. A caption conversion unit delays the caption data for the video data conversion processing time and also converts the caption data of one format type to another format type. A multiplexer outputs the first video data with the first caption data followed by the converted video data with the third caption data having the first-type format.

10 Claims, 5 Drawing Sheets

(56) References Cited

U.S. PATENT DOCUMENTS

| | | | |
|---|---|---|---|
| 5,914,757 A * | 6/1999 | Dean et al. | 348/584 |
| 6,421,094 B1 * | 7/2002 | Han | 348/569 |
| 6,556,252 B1 * | 4/2003 | Kim | 348/565 |
| 6,873,368 B1 * | 3/2005 | Yu et al. | 348/441 |
| 6,952,236 B2 * | 10/2005 | Orr | 348/465 |
| 7,030,932 B2 * | 4/2006 | Han | 348/554 |
| 7,061,544 B1 * | 6/2006 | Nonomura et al. | 348/568 |
| 7,124,365 B2 * | 10/2006 | Cavallerano et al. | 715/716 |
| 7,227,583 B2 * | 6/2007 | Sin | 348/570 |
| 7,231,603 B2 * | 6/2007 | Matsumoto | 715/716 |
| 7,333,150 B2 * | 2/2008 | Cooper | 348/515 |
| 7,400,359 B1 * | 7/2008 | Adams | 348/441 |
| 7,450,179 B2 * | 11/2008 | Higashi et al. | 348/555 |
| 7,920,207 B2 * | 4/2011 | Dumont et al. | 348/465 |
| 8,111,334 B2 * | 2/2012 | Mizutani et al. | 348/705 |
| 8,643,696 B2 * | 2/2014 | Kee | 348/14.08 |
| 2002/0008780 A1 * | 1/2002 | Han | 348/554 |
| 2003/0035063 A1 * | 2/2003 | Orr | 348/465 |
| 2006/0109378 A1 * | 5/2006 | Yang et al. | 348/465 |
| 2007/0002173 A1 * | 1/2007 | Cha et al. | 348/465 |
| 2007/0002179 A1 * | 1/2007 | Naka | 348/588 |
| 2007/0064743 A1 * | 3/2007 | Bettis et al. | 370/503 |
| 2008/0129864 A1 * | 6/2008 | Stone et al. | 348/468 |
| 2008/0254826 A1 * | 10/2008 | Kwon | 455/556.1 |
| 2008/0316370 A1 * | 12/2008 | Tanigawa et al. | 348/725 |
| 2009/0207305 A1 * | 8/2009 | Fujita et al. | 348/468 |
| 2010/0229078 A1 * | 9/2010 | Otsubo et al. | 715/203 |
| 2011/0112934 A1 * | 5/2011 | Ishihara | 705/27.1 |
| 2011/0149153 A1 * | 6/2011 | Nam et al. | 348/468 |
| 2011/0164673 A1 * | 7/2011 | Shaffer | 375/240.01 |
| 2013/0287372 A1 * | 10/2013 | Dachiku | 386/353 |
| 2014/0028912 A1 * | 1/2014 | Lenzi et al. | 348/468 |
| 2014/0089798 A1 * | 3/2014 | Evans | 715/716 |
| 2014/0259084 A1 * | 9/2014 | Polumbus et al. | 725/116 |

* cited by examiner

MULTI-FORMAT OUTPUT DEVICE, CONTROL METHOD FOR MULTI-FORMAT OUTPUT DEVICE

CROSS-REFERENCE TO RELATED APPLICATION

This application is based upon and claims the benefit of priority from Japanese Patent Application No. 2012-203347, filed Sep. 14, 2012, the entire contents of which are incorporated herein by reference.

FIELD

Embodiments described herein relate to a multi-format output device and a control method for multi-format output device.

BACKGROUND

When encoded data of the SD (Standard Definition) format are supplied to a multi-format output device, the encoded data are decoded into SD video data, and the decoded data are then up-converted into HD (High Definition) video data. In this way, the multi-format output device integrates SD video data with HD video data, which is obtained by decoding encoded HD data. The multi-format output device outputs the HD video data when the output format is HD and down converts the HD video data and outputs the down converted data as SD video data when the output format is SD.

Also, the multi-format output device converts SD caption data added to the encoded SD data into HD caption data for the up-conversion of the SD video data into the HD video data. In this way, the multi-format output device integrates the SD caption data with the HD caption data. The multi-format output device multiplexes the HD caption data with the HD video data when the output format is HD, and converts the HD caption data to the SD caption data and multiplexes them with the SD video data when the output format is SD.

However, in the case of outputting the encoded SD data in the SD format, a multi-format output device may have to perform down-conversion after first up-converting the SD video data. As a result, the image quality of the SD video data may deteriorate. Also, in the case of outputting the encoded SD data in the SD format, the multi-format output device may have to convert the caption data into SD caption data after converting them into HD caption data. As a result, the processing becomes complicated.

As described above, since the related multi-format output device carries out conversion twice when outputting SD video data or SD caption data in the SD format, the image quality of the SD video data may deteriorate, and the processing becomes complicated.

DETAILED DESCRIPTION

Figure 1:
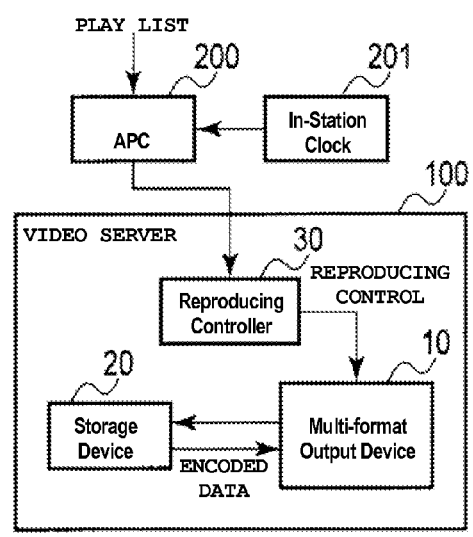
FIG. 1 is a diagram illustrating the functional configuration of a broadcasting station, wherein a video server equipped with a multi-format output device according to an embodiment of the present disclosure may be incorporated.

In general, an embodiment will be explained with reference to the drawings. As an example embodiment, a multi-format output device and a control method for a multi-format output device that can output an HD image with HD captions and/or an SD image with SD captions without complicated processing and without deterioration in image quality is described.

According to an embodiment, a multi-format output device includes a first decoder configured to receive a first-type encoded data and decode the first-type encoded data to generate a first video data having a first-type format (e.g., High-Definition or Standard Definition) and a first caption data having the first-type format, and a second decoder configured to receive a second-type encoded data and decode the second-type encoded data to generate a second video data having a second-type format (e.g., High-Definition or Standard Definition) and a second caption data having the second-type format. A conversion unit configured to convert the second video data to generate a third video data having the first-type format is included. The conversion unit may also be configured to convert first video data to generate a fourth video data having the second-type format. A first buffer is configured to store the first-type encoded data or the first video data for at least a first period of time substantially equivalent to a period of time required for the conversion unit to generate the third video data. A caption conversion unit is configured to delay output of the first caption data for at least the first period of time and generate a third caption data by converting the second caption data to the first-type format. A first multiplexing unit is configured to output the first video data with the first caption data followed by the third video data with the third caption data.

According to another embodiment, a multi-format output device includes a receiving circuit, first and second decoders, a conversion unit, a buffer, a caption conversion unit, a multiplexing unit, and an output unit. The receiving circuit receives a first encoded data and a second encoded data in a video format different from the first encoded data and separates and outputs the first encoded data and the second encoded data. The first decoder decodes the first encoded data supplied from the receiving circuit to generate the first video data and the first caption data. The second decoder decodes the second encoded data supplied from the receiving circuit to generate the second video data and the second caption data. The conversion unit converts the first video data generated by the first decoder into a third video data conforming to the same definition as the second video data. The buffer holds the second video data generated by the second decoder and delays the video data by the period of time needed for the conversion processing in the conversion unit. The caption conversion unit delays the first and second caption data by the period of time and converts the first caption data into a third caption data conforming to the definition. The multiplexing unit multiplexes the third caption data with the third video data and multiplexes the delayed second caption data with the delayed second video data. The output unit outputs the second video data multiplexed with the second caption data when outputting the third video data multiplexed with the third caption data.

FIG. 1 is a diagram illustrating an example of the functional configuration of a broadcasting station, wherein a video server 100 equipped with a multi-format output device 10 disclosed in this embodiment is set up. As shown in FIG. 1, a video server 100, an automatic program sending controller (APC) 200, and an in-station clock 201 are set in a broadcasting station. The APC 200 outputs an instruction to the video server 100 to reproduce the program materials that is to be reproduced according to the time shown in the in-station clock 201 when the in-station clock 201 reaches the time indicated in a play list formed based on the broadcasting schedule.

The video server 100 includes a multi-format output device 10, a storage device 20, and a reproducing controller 30. The multi-format output device 10 is connected to the storage device 20 by, for example, an Ethernet connection.

Instructions are sent from APC 200 to the reproducing controller 30 to control the multi-format output device 10 to output the designated program material to a prescribed output destination.

The reproducing controller 30 controls the multi-format output device 10 to read out encoded SD data and/or the encoded HD data stored in the storage device 20. The constituent elements of the multi-format output device 10 are controlled appropriately to output the program material to the designated output destination.

In this embodiment, the encoded SD data are obtained by encoding the SD video data and SD caption data added to the SD video data. A preset encoding method is used in this example to generate the encoded SD data. The encoded HD data are obtained by encoding the HD video data and the HD caption data added to the HD video data using. A preset encoding method is used in this example to generate the encoded HD data.

Figure 2:
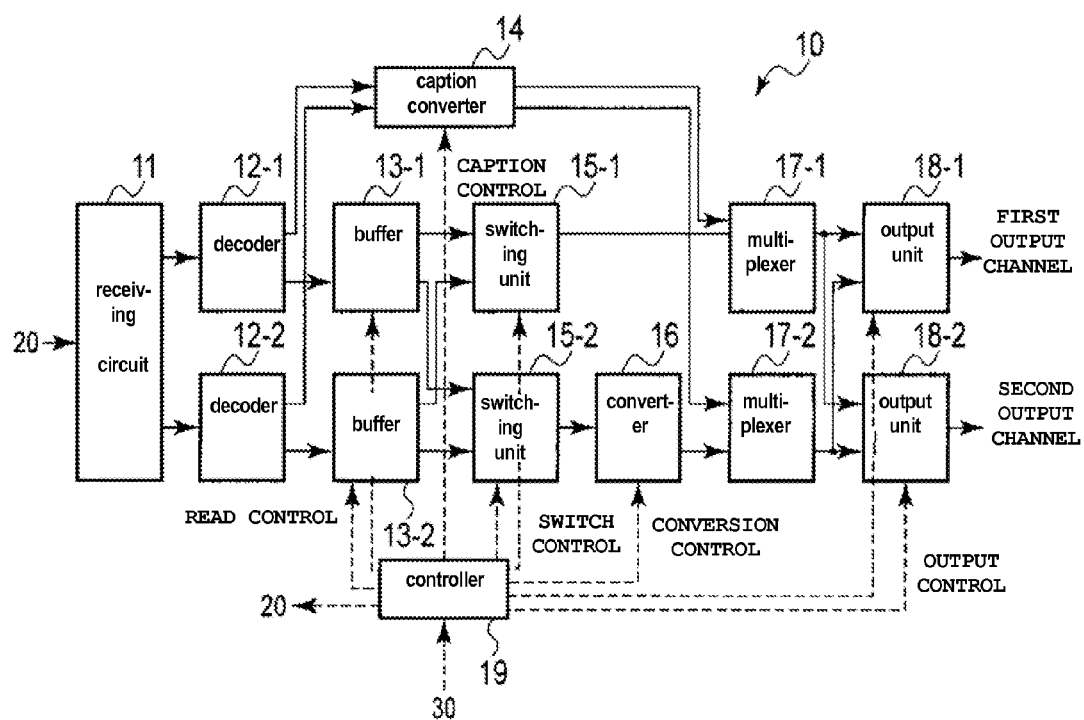
FIG. 2 depicts a multi-format output device according to an embodiment.

FIG. 2 is a block diagram illustrating the functional configuration of the multi-format output device 10 disclosed in this embodiment. The multi-format output device 10 shown in FIG. 2 includes a receiving circuit 11, a first decoder 12-1, a second decoder 12-2, a first buffer 13-1, a second buffer 13-2, a caption converter 14, a first switching unit 15-1, a second switching unit 15-2, a converter 16, a first multiplexer 17-1, a second multiplexer 17-2, a first output unit 18-1, a second output unit 18-2, and a controller 19.

The receiving circuit 11 receives encoded data supplied from the storage device 20 and then selectively outputs the received encoded data to the first or second decoder 12-1, 12-2. When the encoded data having a single format are supplied continuously, the receiving circuit 11 outputs the supplied encoded data to the same decoder. When the encoded data having different formats are supplied simultaneously, the receiving circuit 11 outputs the different encoded data to different decoders.

For example, when the encoded SD data are supplied from the receiving circuit 11, the first decoder 12-1 decodes the encoded SD data to generate SD video data and the caption data for SD. When the encoded HD data are supplied from the receiving circuit 11, the first decoder 12-1 decodes the encoded HD data to generate HD video data and the caption data for HD.

The first decoder 12-1 outputs the SD video data or HD video data generated by the decoding processing to the first buffer 13-1 and outputs the SD caption data or the HD caption data to the caption converter 14. Similar to the first decoder 12-1, the second decoder 12-2 decodes the encoded SD data or the encoded HD data supplied from the receiving circuit 11 to generate the SD video data or the HD video data and the caption data for SD or the caption data for HD. The second decoder 12-2 outputs the SD video data or HD video data generated by the decoding processing to the second buffer 13-2 and outputs the SD caption data or the HD caption data to the caption converter 14.

The SD video data or HD video data are supplied from the first decoder 12-1 to the first buffer 13-1. The first buffer 13-1 outputs the supplied SD video data or HD video data to the first and second switching units 15-1, 15-2 according to the first read control from the controller 19. Based on the first read control, the first buffer 13-1 delays the output of the SD video data or HD video data to the first switching unit 15-1 by as much as the time needed for the conversion processing performed by the converter 16 compared to the output time of the SD video data or HD video data to the second switching unit 15-2.

The SD video data or HD video data are supplied from the second decoder 12-2 to the second buffer 13-2. The second buffer 13-2 outputs the supplied SD video data or HD video data to the first and second switching units 15-1, 15-2 according to the second read control from the controller 19. Based on the second read control, the second buffer 13-2 delays the output of the SD video data or HD video data to the first switching unit 15-1 by as much as the time needed for the conversion processing performed by the converter 16 compared to the output time of the SD video data or HD video data to the second switching unit 15-2.

The caption converter 14 receives the caption data for SD or caption data for HD supplied from the first decoder 12-1 and receives the caption data for SD or caption data for HD supplied from the second decoder 12-2.

According to a caption control sent from the controller 19, the caption converter 14 delays outputting of the received SD caption data by as much as the time needed for the conversion processing performed by the converter 16, and then outputs the caption data to the first multiplexer 17-1.

Also, according to the caption control sent from the controller 19, the caption converter 14 converts received SD caption data into HD caption data, delays outputting of the caption data by as much as the time needed for the conversion processing performed by the converter 16, and then outputs the caption data to the second multiplexer 17-2.

In addition, according to the caption control sent from the controller 19, the caption converter 14 delays outputting of the received HD caption data by as much as the time needed for the conversion processing performed by the converter 16 and then outputs the HD caption data to the first multiplexer 17-1.

Moreover, according to the caption control sent from the controller 19, the caption converter 14 converts the received HD caption data into SD caption data, delays outputting of the caption data by as much as the time needed for the conversion processing performed by the converter 16, and then outputs the SD caption data to the second multiplexer 17-2.

According to a first switching control sent from the controller 19, the first switching unit 15-1 switches between outputting, to the first multiplexer 17-1, the SD video data supplied from the first buffer 13-1 and the HD video data supplied from the second buffer 13-2, or the HD video data supplied from the second buffer 13-2 and the SD video data supplied from the first buffer 13-1.

According to the first switching control sent from the controller 19, the first switching unit 15-1 switches between outputting, to the first multiplexer 17-1, the HD video data supplied from the first buffer 13-1 and the SD video data supplied from the second buffer 13-2, or the SD video data supplied from the second buffer 13-2 and the HD video data supplied from the first buffer 13-1.

According to a second switching control sent from the controller 19, the second switching unit 15-2 switches between outputting, to the converter 16, the SD video data supplied from the first buffer 13-1 and the HD video data supplied from the second buffer 13-2, or the HD video data supplied from the second buffer 13-2 and the SD video data supplied from the first buffer 13-1.

According to the second switching control sent from the controller 19, the second switching unit 15-2 switches between outputting, to the converter 16, the HD video data supplied from the first buffer 13-1 and the SD video data supplied from the second buffer 13-2, or the SD video data supplied from the second buffer 13-2 and the HD video data supplied from the first buffer 13-1.

When the SD video data are supplied from the second switching unit 15-2, the converter 16 up-converts the supplied SD video data into the HD video data according to a conversion control sent from the controller 19. The converter 16 outputs the HD video data obtained after the up-conversion to the second multiplexer 17-2. When the HD video data are supplied from the second switching unit 15-2, the converter 16 down converts the supplied HD video data into the SD video data according to the conversion control sent from the controller 19. The converter 16 outputs the SD video data obtained after the down-conversion to the second multiplexer 17-2.

When SD video data are supplied from the first switching unit 15-1, the first multiplexer 17-1 multiplexes the SD caption data supplied from the caption converter 14 as ancillary data with the supplied SD video data. The first multiplexer 17-1 outputs the SD video data with the multiplexed SD caption data to the first and second output units 18-1, 18-2.

When HD video data are supplied from the first switching unit 15-1, the first multiplexer 17-1 multiplexes the HD caption data from the caption converter 14 as the ancillary data with the supplied HD video data. The first multiplexer 17-1 outputs the HD video data multiplexed with the HD caption data to the first, second output units 18-1, 18-2.

When SD video data are supplied from the converter 16, the second multiplexer 17-2 multiplexes the SD caption data supplied from the caption converter 14 as the ancillary data with the supplied SD video data. The second multiplexer 17-2 outputs the SD video data multiplexed with the SD caption data for SD to the first and second output units 18-1, 18-2.

When HD video data are supplied from the converter 16, the second multiplexer 17-2 multiplexes the HD caption data supplied from the caption converter 14 as the ancillary data with the supplied HD video data. The second multiplexer 17-2 outputs the HD video data multiplexed with the HD caption data to the first and second output units 18-1, 18-2.

The first output unit 18-1 is connected to the first output channel. This output channel is preset to output SD video data or HD video data. In this embodiment, the first output channel outputs the HD video data.

When receiving SD video data from the first multiplexer 17-1, the first output unit 18-1 receives the HD video data from the second multiplexer 17-2.

When receiving HD video data from the first multiplexer 17-1, the first output unit 18-1 receives the SD video data from the second multiplexer 17-2. According to a first output control sent from the controller 19, the first output unit 18-1 switches the connection to output the HD video data. In this way, the HD video data are output seamlessly to the first output channel.

The second output unit 18-2 is connected to the second output channel. In this embodiment, the second output channel outputs the SD video data.

When receiving HD video data from the first multiplexer 17-1, the second output unit 18-2 receives the SD video data from the second multiplexer 17-2.

When receiving the SD video data from the first multiplexer 17-1, the second output unit 18-2 receives the HD video data from the second multiplexer 17-2. According to a second output control sent from the controller 19, the second output unit 18-2 switches the connection to output the SD video data. In this way, the SD video data are output seamlessly to the second output channel.

The controller 19 is equipped with a CPU (central processing unit) including a microprocessor. According to a reproducing control sent from the reproducing controller 30, controller 19 reads out the encoded SD data or the HD encoded data from the storage device 20 and controls the first buffer 13-1, the second buffer 13-2, the caption converter 14, the first switching unit 15-1, the second switching unit 15-2, the converter 16, the first output unit 18-1, and the second output unit 18-2.

In the following example, the processing of the controller 19 when the multi-format output device 10 having the configuration described above outputs HD video data from the first output channel and outputs SD video data from the second output channel will be described.

Figure 3:
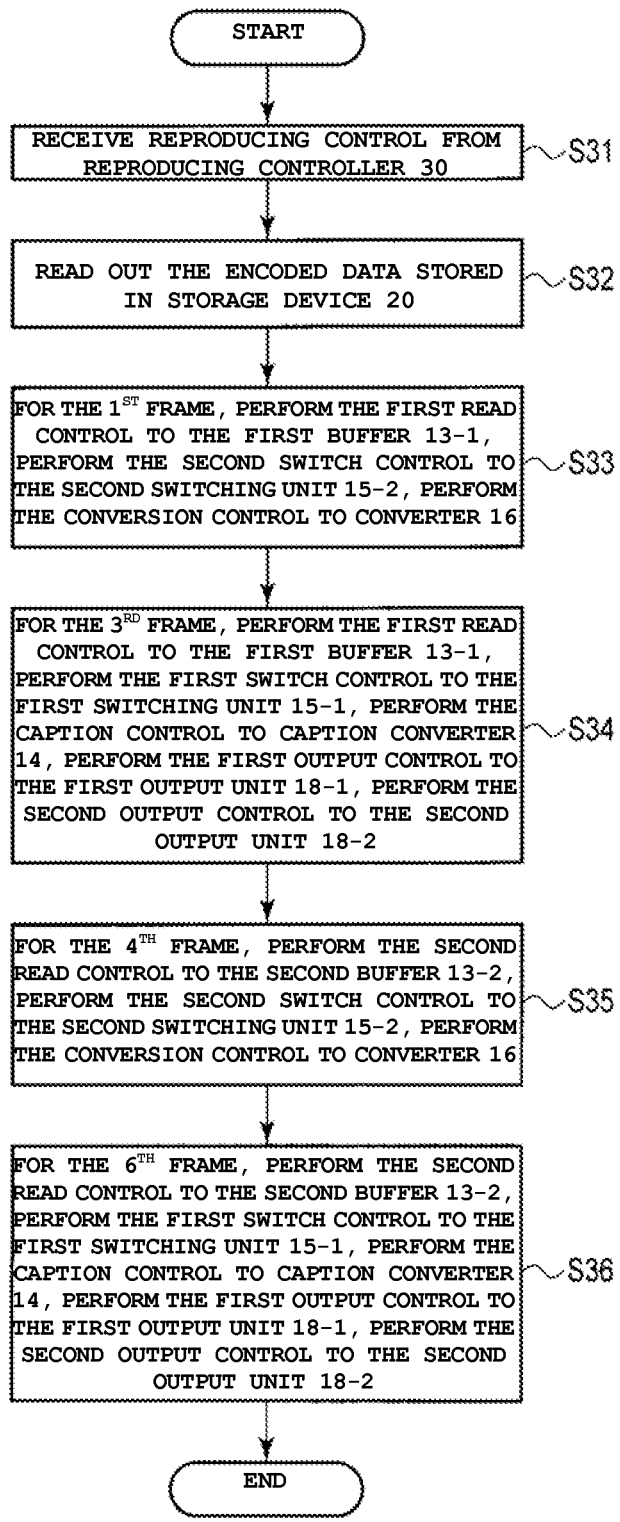
FIG. 3 is a flow chart illustrating the processing of the control unit in an embodiment of a multi-format output device when HD video data and SD video data are output.

FIG. 3 is a flow chart illustrating the processing of the controller 19 when the multi-format output device 10 outputs HD video data and SD video data. FIG. 3 shows a case, in which the encoded HD data and the SD format are read out from the storage device 20, the encoded HD data are supplied from the receiving circuit 11 to the first decoder 12-1, and the encoded SD data are supplied from the receiving circuit 11 to the second decoder 12-2.

Figure 4:
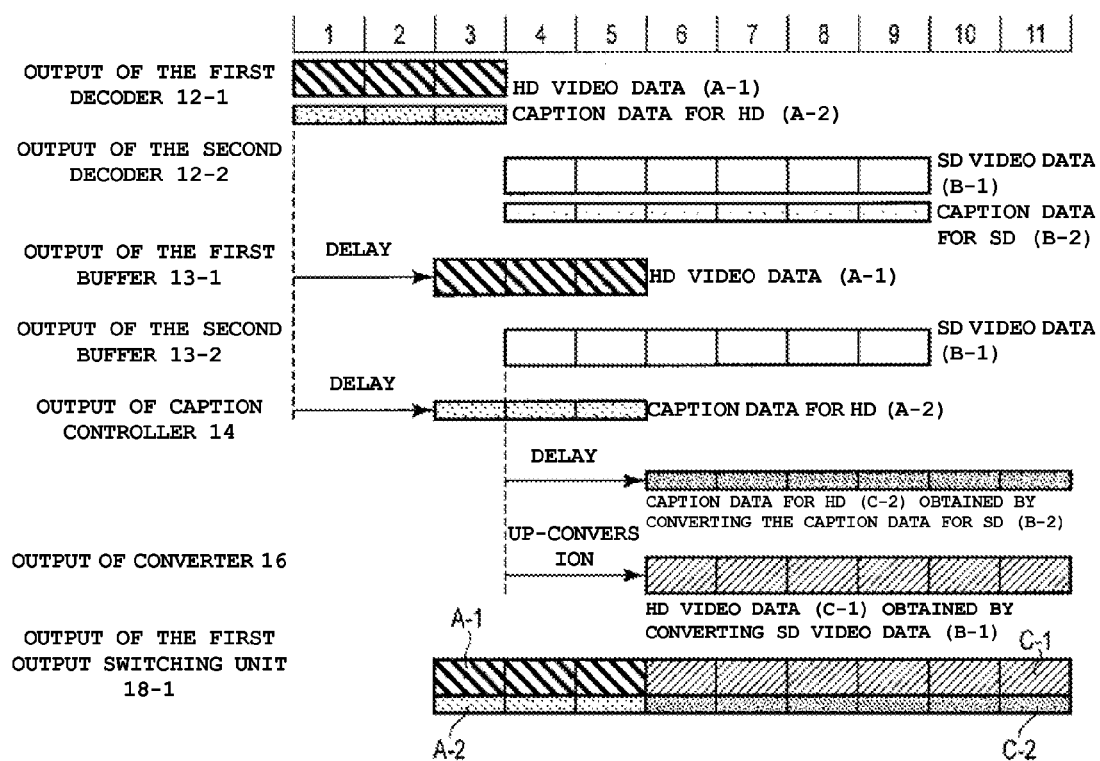
FIG. 4 is a diagram related to the process of outputting the HD video data according to an embodiment.

FIG. 4 is a diagram illustrating the process of outputting the HD video data from the first output unit 18-1.

Figure 5:
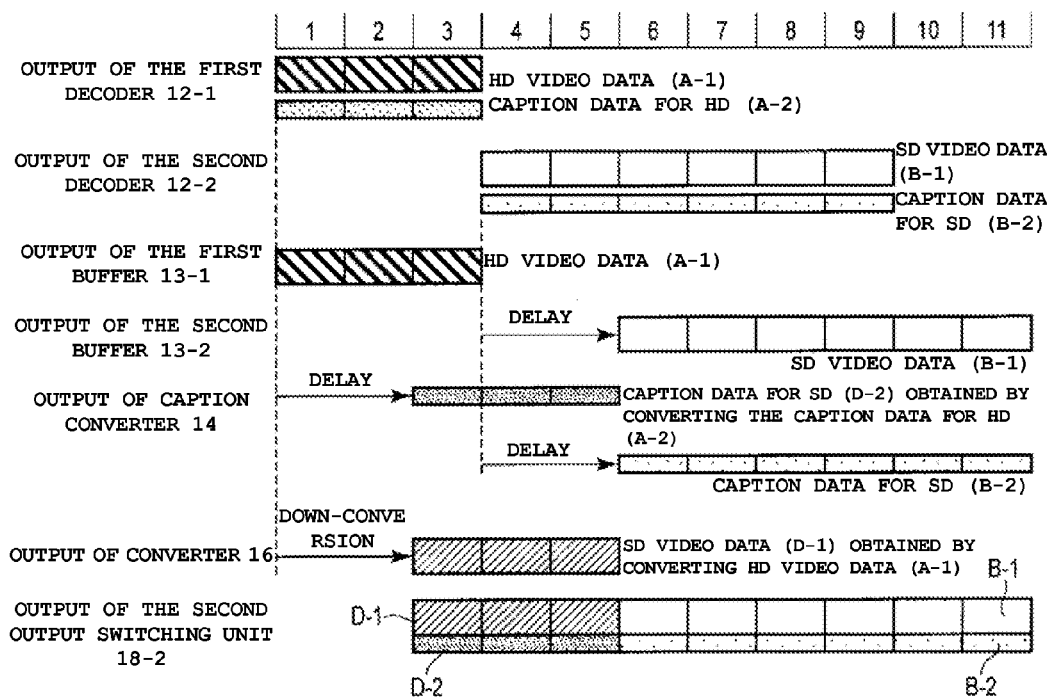
FIG. 5 is a diagram related to the process of outputting the SD video data according to an embodiment.

FIG. 5 is a diagram illustrating the process of outputting the SD video data from the second output unit 18-2.

First, after receiving the reproducing control from the reproducing controller 30 (step S31), the controller 19 reads out the encoded HD data and the encoded SD data stored in the storage device 20 (step S32).

The receiving circuit 11 outputs the encoded HD data to the first decoder 12-1 and outputs the encoded SD data to the second decoder 12-2. The first decoder 12-1 decodes the encoded HD data into HD video data and outputs the HD video data from the first frame to the third frame to the first buffer 13-1.

The controller 19 issues the first read control to output the HD video data from the first buffer 13-1 to the second switching unit 15-2 for the first frame of the HD video data in the first buffer 13-1.

The controller 19 issues the second switch control to output the HD video data supplied from the first buffer 13-1 via the second switching unit 15-2 to the converter 16.

The controller 19 issues a conversion control to start the down-conversion of the HD video data in the converter 16 (step S33). The converter 16 takes two frames for pipeline processing the down-conversion and outputs SD video data starting from the third frame to the first and second output units 18-1, 18-2.

The controller 19 issues the first read control to output the HD video data supplied from the first decoder 12-1 to the first switching unit 15-1 via the first buffer 13-1 for the third frame.

The controller 19 issues the first switch control to output the HD video data supplied from the first buffer 13-1 to the first multiplexer 17-1 with respect to the first switching unit 15-1.

The controller 19 performs a caption control to output the caption data for HD supplied from the first decoder 12-1 to the first multiplexer 17-1 with respect to the caption converter 14.

The controller 19 performs a caption control to convert the caption data for HD supplied from the first decoder 12-1 into the caption data for SD and output the caption data to the second multiplexer 17-2 with respect to the caption converter 14.

The controller 19 performs the first output control to output the HD video data multiplexed with the caption data for HD supplied from the first multiplexer 17-1 with respect to the first output unit 18-1.

The controller 19 performs the second output control to output the SD video data multiplexed with the caption data for SD supplied from the second multiplexer 17-2 with respect to the second output unit 18-2 (step S34).

The second decoder 12-2 decodes the encoded SD data supplied from the receiving circuit 11 for the $4^{th}$ frame to the $9^{th}$ frame into the SD video data and outputs the decoded SD video data to the second buffer 13-2.

The controller 19 performs the second read control to output the SD video data supplied from the second decoder 12-2 to the second switching unit 15-2 with respect to the second buffer 13-2 for the $4^{th}$ frame.

The controller 19 performs the second switch control to output the SD video data supplied from the second buffer 13-2 to the converter 16 with respect to the second switching unit 15-2.

The controller 19 performs conversion control to start the up-conversion of the SD video data supplied from the second switching unit 15-2 with respect to the converter 16 (step S35). The converter 16 takes two frames for the up-conversion and outputs the HD video data starting from the $6^{th}$ frame to the first and second output units 18-1, 18-2 after the up-conversion.

The controller 19 performs the second read control to output the SD video data supplied from the second decoder 12-2 to the first switching unit 15-1 with respect to the second buffer 13-2 for the $6^{th}$ frame.

The controller 19 performs the first switch control to output the SD video data supplied from the second buffer 13-2 to the first multiplexer 17-1 with respect to the first switching unit 15-1.

The controller 19 performs a caption control to output the caption data for SD supplied from the second decoder 12-2 to the first multiplexer 17-1 with respect to the caption converter 14. With respect to the caption converter 14, the controller 19 converts the caption data for SD supplied from the second decoder 12-2 into the caption data for HD and performs a caption control to output the caption data to the second multiplexer 17-2.

The controller 19 performs the first output control to output the HD video data multiplexed with the caption data for HD supplied from the second multiplexer 17-2 with respect to the first output unit 18-1.

The controller 19 performs the second output control to output the SD video data multiplexed with the caption data for SD supplied from the first multiplexer 17-1 with respect to the second output unit 18-2 (step S36).

According to the process shown in FIG. 3, the controller 19 can seamlessly connect the HD video data obtained from the encoded HD data and the HD video data obtained from the encoded SD data between the $5^{th}$ frame and the $6^{th}$ frame in the first output unit 18-1 (see FIG. 4). Also, the controller 19 can seamlessly connect the SD video data obtained from the encoded HD data and the SD video data obtained from the encoded SD data between the $5^{th}$ frame and the $6^{th}$ frame in the second output unit 18-2.

FIG. 3 shows a case in which the SD video data are output to the second output channel at the same time when the HD video data are output to the first output channel. The present invention, however, is not limited to this. Depending on the reproducing control of the reproducing controller 30, the controller 19 can also output the HD video data only to the first output channel. Also, depending on the reproducing control of the reproducing controller 30, the controller 19 can also output the SD video data only to the second output channel.

As described above, in this embodiment, the controller 19 delays the data output from the first buffer 13-1 to the first switching unit 15-1 by as much as the time needed for the processing in the converter 16 compared to the data output from the first buffer 13-1 to the second switching unit 15-2. Then, the controller 19 converts the caption data supplied from the first decoder 12-1 as demanded, delays the caption data by as much as time needed for the processing in the converter 16, and outputs the caption data to the first and second multiplexers 17-1, 17-2. Also, the controller 19 delays the data output from the second buffer 13-2 to the first switching unit 15-1 by as much as the time needed for the processing in the converter 16 compared to the data output from the second buffer 13-2 to the second switching unit 15-2. Then, the controller 19 controls caption converter 14 to convert the caption data supplied from the second decoder 12-2 as demanded, delays the caption data by as much as the time needed for the processing in the converter 16, and outputs the caption data to the first and second multiplexers 17-1, 17-2. In this way, the multi-format output device 10 can eliminate the signal delay caused by the up-conversion and down-conversion processing, and it is only necessary to convert the caption data once. Therefore, the complicated control needed in the related art becomes unnecessary. Even if the multi-format output device 10 outputs the SD video data, it is only necessary to convert the SD video data once. Therefore, deterioration of the SD video data can be reduced.

Consequently, the multi-format output device disclosed in this embodiment can output an HD image with caption for an HD and/or SD image with caption for SD without undergoing complicated processing and without having image quality deterioration.

In the embodiment described above, the case in which the converter 16 performs either the up-conversion that converts the SD video data to the HD video data or the down-conversion that converts the HD video data to the SD video data has been explained. However, the converter 16 can also perform a cross conversion that converts first HD video data based on 1080i to second HD video data based on 720p or converts the second HD (720p) video data to the first HD (1080i) video data.

For example, in the case of outputting the first HD video data from the first output channel and the second HD video data from the second output channel, the controller 19 performs the first and second read controls to delay the output of the video data to the first switching unit 15-1 by as much as the time needed for the cross conversion with respect to the first and second buffers 13-1, 13-2.

Also, the controller 19 performs a caption control to delay the output of the caption data for the first and second HD video data by as much as the time needed for the cross conversion with respect to the caption converter 14.

Figure 6:
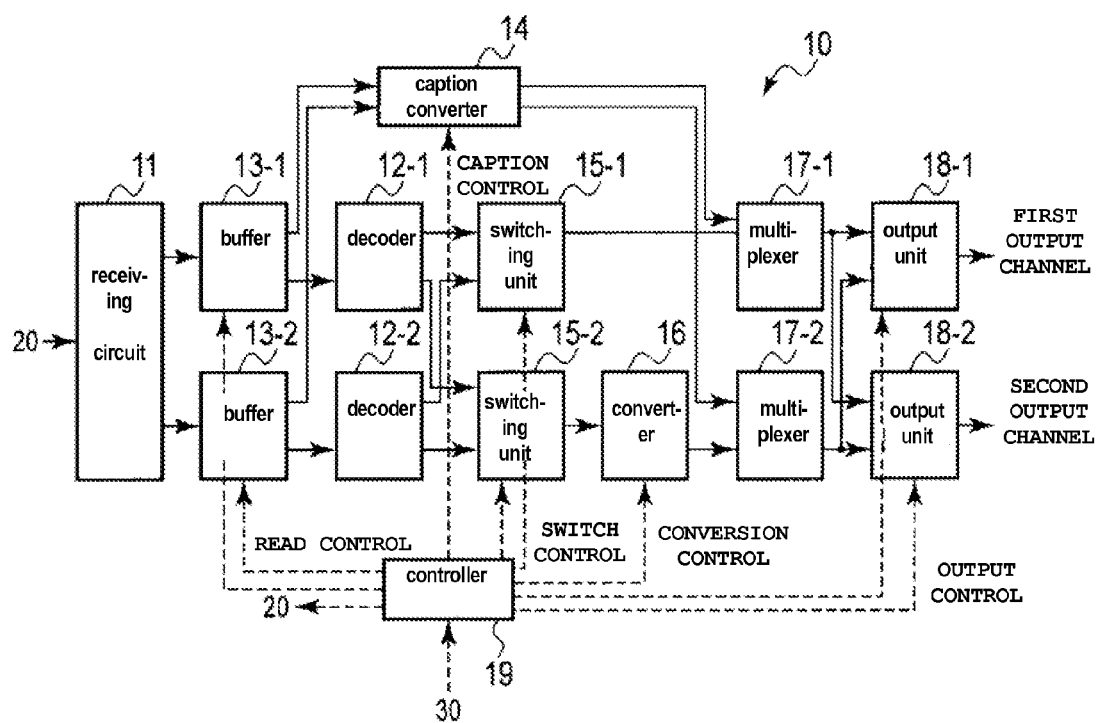
FIG. 6 is depicts a multi-format output device according to an embodiment.

Also, in this embodiment, the case in which the multi-format output device 10 has the functional configuration shown in FIG. 2 has been explained. The multi-format output device, however, can also have other configurations, such as the functional configuration shown in FIG. 6. That is, it is also possible to decode the encoded data by the first and second decoders 12-1, 12-2 after the data are first stored in the first and second buffers 13-1, 13-2.

In this embodiment, the case in which the first and second output units 18-1, 18-2 are connected to the first and second output channels, respectively, has been explained. The exemplary embodiment, however, is not limited to this. For example, the multi-format output device 10 can further include a third output unit 18-3 connected to a third output channel used for outputting the second HD video data based on 720p.

In each of the embodiments, the case in which the multi-format output device 10 has two sub-systems (that is, two input/output pathways) has been explained. The present disclosure, however, is not limited to this. For example, an exemplary embodiment can include a multi-format output device 10 with more than two sub-systems, such that additional buffers/decoders/switches/multiplexers/output units, etc. may be incorporated to accommodate additional input/output formats as desired.

In each of the embodiments, the case in which the multi-format output device 10 has one converter 16 has been explained. The embodiments of the present disclosure, however, are not limited to this configuration. For example, the exemplary embodiment can be embodied in the same way even if the multi-format output device 10 has two or more converters.

Also, the multi-format output device is not limited use in a video server. The embodiments can be applied to any system that requires mutual conversion and output of video signal in a plurality of formats.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A multi-format output device, comprising:
a receiving circuit configured to receive a first-type encoded data and a second-type encoded data and separate the first-type encoded data and the second-type encoded data;
a first decoder configured to receive the first-type encoded data separated by the receiving circuit and decode the first-type encoded data to generate a first video data having a first-type format and a first caption data having the first-type format;
a second decoder configured to receive the second-type encoded data separated by the receiving circuit and decode the second-type encoded data to generate a second video data having a second-type format and a second caption data having the second-type format;
a conversion unit configured to convert the second video data to generate a third video data having the first-type format and convert the first video data to generate a fourth video data having the second-type format;
a first buffer configured to store the first-type encoded data or the first video data for at least a first period of time substantially equivalent to a period of time required for the conversion unit to generate the third video data, if the conversion unit converts the second video data into the third video data;
a second buffer configured to store the second-type encoded data or the second video data for at least a second period of time substantially equivalent to a period of time required for the conversion unit to generate the fourth video data, if the conversion unit converts the first video data into the fourth video data;
a caption conversion unit configured to delay output of the first caption data for at least the first period of time and delay output of a third caption data generated by converting the second caption data to the first-type format for at least the first period of time, if the conversion unit converts the second video data into the third video data, and delay output of the second caption data for at least the second period of time and delay output of a fourth caption data generated by converting the first caption data to the second-type format for at least the second period of time, if the conversion unit converts the first video data into the fourth video data;
a first switching unit configured to switch between sending the delayed first video data and the delayed second video data;
a first multiplexer configured to multiplex the delayed first caption data from the caption conversion unit with the delayed first video data from the first switching unit and multiplex the delayed second caption data from the caption conversion unit with the delayed second video data from the first switching unit
a second switching unit configured to switch between sending the first video data and the second video data to the conversion unit;
a second multiplexer configured to multiplex the third video data from the conversion unit with the third caption data from the caption conversion unit and multiplex the fourth video data from the conversion unit with the fourth caption data from the caption conversion unit; and
a controller configured to control output of video data from the first and second multiplexers according to a designation of an output channel type as a first-type channel and second-type channel.

2. The multi-format output device of claim 1, wherein the first-type format is a high-definition video format and the second-type format is a standard definition video format.

3. The multi-format output device of claim 2, wherein the high-definition video format is a 1080i format.

4. The multi-format output device of claim 1, wherein the first-type format is a standard-definition video format and the second-type format is a high-definition video format.

5. The multi-format output device of claim 1, wherein the first-type format is a 720p high-definition format and the second-type format is a 1080i high-definition format.

6. The multi-format output device of claim 1, wherein the first video data with the first caption data followed by the third video data with the third caption data is transmitted to a plurality of receivers.

7. A control method for a multi-format output device, comprising:
receiving a first-type encoded data and a second-type encoded data the first-type encoded data different from the second-type encoded data;
separating the first-type encoded data and the second-type encoded data;
decoding the first-type encoded data to generate a first video data having a first-type format and a first caption data having the first-type format;

decoding the second encoded data to generate a second video data having a second-type format and a second caption data having the second-type format;

converting the second video data or the first video data into a third video data having the first-type format or a fourth video data having the second-type format, respectively;

delaying, if the second video data converted into the third video data, the first video data for at least a first period of time substantially equivalent to a period of time required for converting the second video data to the third video data;

delaying, if the first video data converted into the fourth video data, the second video data for at least a second period of time substantially equivalent to a period of time required for converting the first video data to the fourth video data;

delaying, if the second video data converted into the third video data, output of the first caption data for at least the first period of time and output of a third caption data generated by converting the second caption data to the first-type format for at least the first period of time;

delaying, if the first video data converted into the forth video data, output of the second caption data for at least the second period of time and output of a fourth caption data generated by converting the second caption data to the second-type format for at least the second period of time;

multiplexing the third caption data with the third video data or the fourth caption data with the fourth video data;

multiplexing the delayed first caption data with the delayed first video data or the delayed second caption data with the delayed second video data; and outputting multiplexed video data in accordance with a designation of an output channel type as a first-type channel and second-type channel.

8. The control method of claim 7, wherein the first-type format is a standard definition format and the second-type format is a high definition format.

9. The control method of claim 7, where the first-type format is a high-definition format of a first resolution and the second-type format is a high definition format of a second resolution that is different from the first resolution.

10. The control method of claim 7, wherein outputting the multiplexed first video data and first caption data followed by the multiplexed third video data and the third caption data includes transmitting the multiplexed first video data and first caption data followed by the multiplexed third video data and the third caption data to a plurality of receivers.

\* \* \* \* \*